United States Patent
Qiao et al.

(10) Patent No.: US 11,016,118 B2
(45) Date of Patent: May 25, 2021

(54) ATOMIC FORCE MICROSCOPE BASED INSTRUMENTATION FOR PROBING NANOSCALE CHARGE CARRIER DYNAMICS WITH IMPROVED TEMPORAL AND SPATIAL RESOLUTION

(71) Applicant: SOUTH DAKOTA STATE UNIVERSITY, Brookings, SD (US)

(72) Inventors: Qiquan Qiao, Brookings, SD (US); Behzad Bahrami, Brookings, SD (US); Ashraful Haider Chowdhury, Brookings, SD (US)

(73) Assignee: SOUTH DAKOTA UNIVERSITY, Brookings, SD (US)

( * ) Notice: Subject to any disclaimer, the term of this patent is extended or adjusted under 35 U.S.C. 154(b) by 0 days.

(21) Appl. No.: 16/766,228

(22) PCT Filed: Nov. 23, 2018

(86) PCT No.: PCT/US2018/062402
§ 371 (c)(1),
(2) Date: May 21, 2020

(87) PCT Pub. No.: WO2019/104254
PCT Pub. Date: May 31, 2019

(65) Prior Publication Data
US 2020/0371135 A1    Nov. 26, 2020

Related U.S. Application Data

(60) Provisional application No. 62/590,017, filed on Nov. 22, 2017.

(51) Int. Cl.
*G01Q 60/30*    (2010.01)
*G01Q 60/38*    (2010.01)

(52) U.S. Cl.
CPC .............. *G01Q 60/30* (2013.01); *G01Q 60/38* (2013.01)

(58) Field of Classification Search
CPC ........ G01Q 60/00; G01Q 60/24; G01Q 60/30; G01Q 60/32; G01Q 60/34; G01Q 60/36
(Continued)

(56) References Cited

U.S. PATENT DOCUMENTS 7,084,661 B2    8/2006    Thompson et al.
8,099,792 B1    1/2012    Hersam et al.
(Continued)

OTHER PUBLICATIONS

International Search Report and Written Opinion for PCT/US2018/062402 dated Mar. 19, 2019.
(Continued)

*Primary Examiner* — Nicole M Ippolito
(74) *Attorney, Agent, or Firm* — Patterson Thuente Pedersen, P.A.

(57) ABSTRACT

A system for conductive atomic force microscopy measurements includes a function generator that drives a light source as well as current provided to a sample, designed sample holder for local charge dynamics measurements and output circuitry that includes both a frequency response analysis as well as a bypass circuit analysis portion. Bypass circuit with external preamplifier helped to overcome the obstacles of commercially available AFM circuit bandwidth (e.g. 100 kHz) to see the local characteristics with high temporal resolution. By obtaining the data output of the frequency response analyzer and the bypass circuitry, local mobility map, local carrier lifetime and transport time map, local carrier density map, and a nanoscale impedance map can be made of complex solid state devices at high temporal and spatial resolutions.

20 Claims, 15 Drawing Sheets

(58) Field of Classification Search
USPC .......................... 850/21, 33, 36, 37, 38, 39
See application file for complete search history.

(56) References Cited

U.S. PATENT DOCUMENTS

| | | | |
|---|---|---|---|
| 9,809,594 B2* | 11/2017 | Jenekhe | H01L 51/0072 |
| 2010/0079630 A1 | 4/2010 | Mishima et al. | |
| 2011/0061452 A1 | 3/2011 | King et al. | |
| 2012/0207002 A1* | 8/2012 | Katsnelson | G11B 5/74 |
| | | | 369/13.02 |
| 2014/0060643 A1* | 3/2014 | Martin | B01J 35/004 |
| | | | 136/256 |
| 2014/0299772 A1* | 10/2014 | Guyot-Sionnest | |
| | | | H01L 31/0272 |
| | | | 250/338.4 |
| 2018/0301646 A1* | 10/2018 | Kanatzidis | H01L 51/0032 |

OTHER PUBLICATIONS

Tennyson et al., "Nanoimaging of Open-Circuit Voltage in Photovoltaic Devices", Advanced Energy Materials. Sep. 24, 2015. vol. 5, No. 23.

* cited by examiner

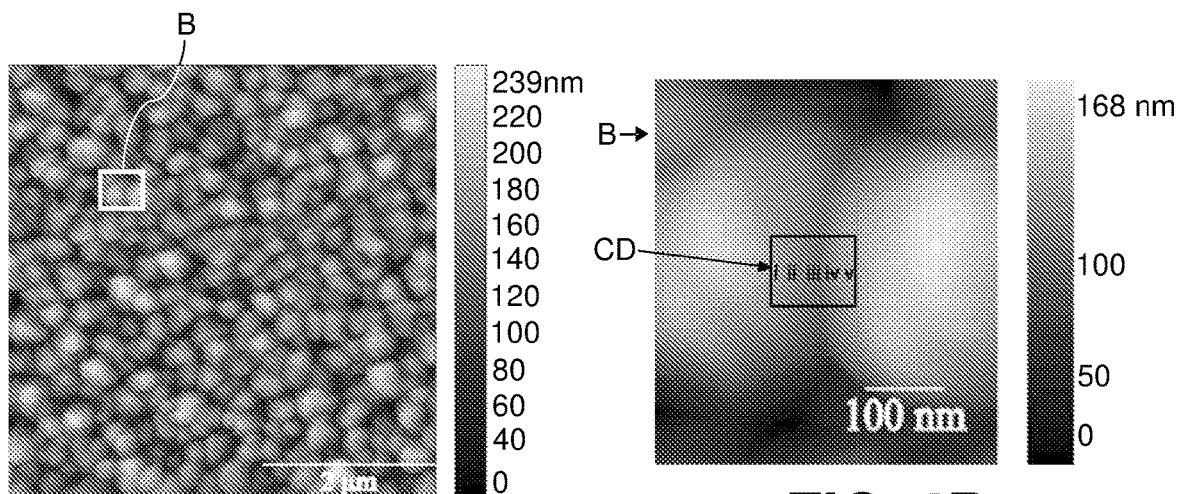
FIG. 4A
FIG. 4B
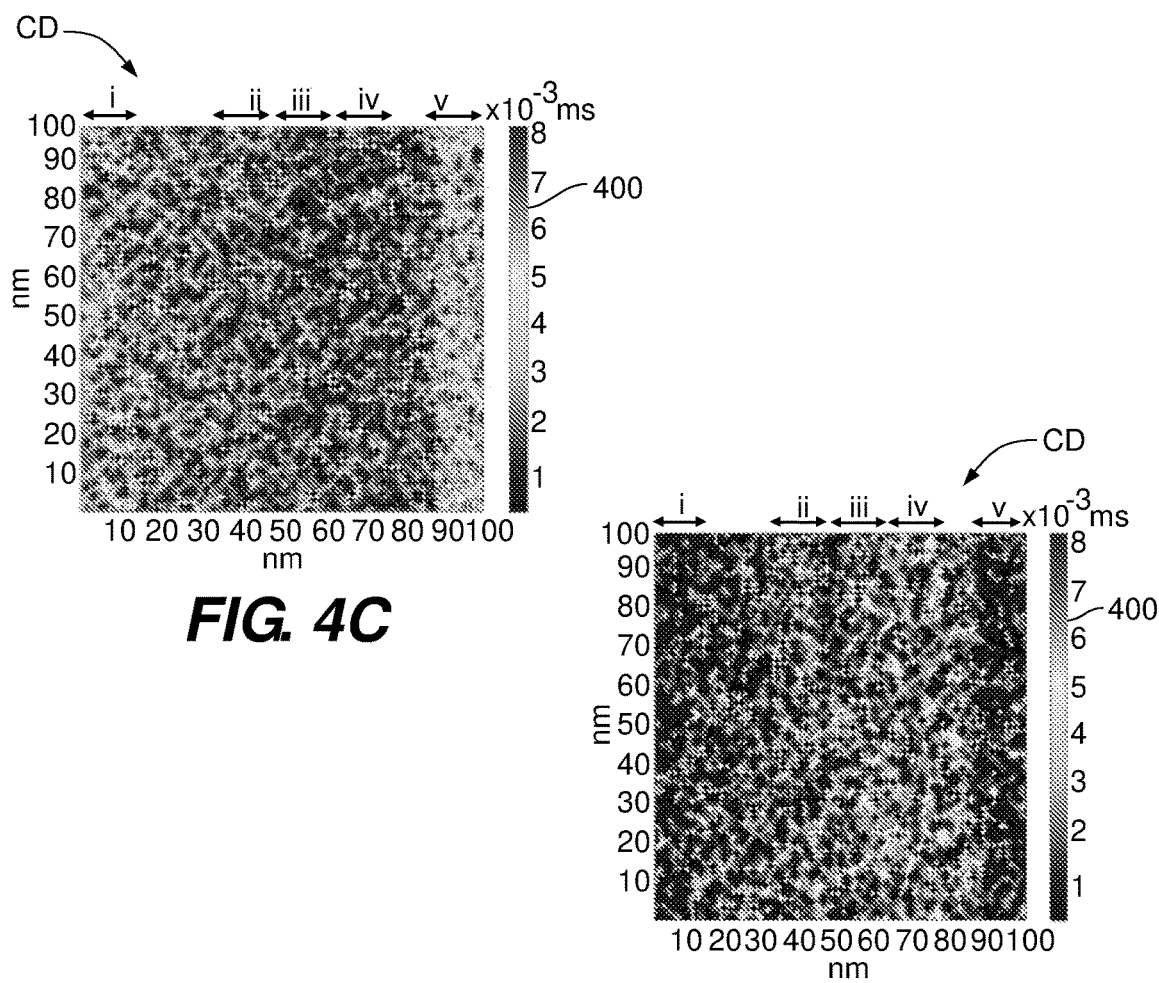
FIG. 4C
FIG. 4D

LIFETIME MAPPING

TRANSPORT TIME MAPPING

DIFFUSION LENGTH MAPPING

LIFETIME MAPPING

TRANSPORT TIME MAPPING

DIFFUSION LENGTH MAPPING

ATOMIC FORCE MICROSCOPE BASED INSTRUMENTATION FOR PROBING NANOSCALE CHARGE CARRIER DYNAMICS WITH IMPROVED TEMPORAL AND SPATIAL RESOLUTION

RELATED APPLICATIONS

This present application is a National Phase entry of PCT Application No. PCT/US2018/062402 filed Nov. 23, 2018 which claims priority to U.S. Provisional Application No. 62/590,017 filed Nov. 22, 2017, the contents of each being incorporated herein by reference in their entireties.

TECHNICAL FIELD

Embodiments described herein can be used to probe local charge carrier dynamics in nanostructured and disordered materials with improved spatial resolution, and also overcome the obstacles of commercially available Atomic force microscope (AFM) circuit bandwidth to detect the local characteristics with improved temporal resolution.

BACKGROUND

Atomic force microscopy (AFM) has conventionally been used for a variety of measurement and analysis tasks. AFM can be conducted by a number of different types of systems. AFM can be used, for example, for topography and surface analysis of a sample. This analysis can be conducted in either contact mode (i.e., with the AFM probe in physical contact with the sample) or in tapping mode (i.e., a probe on a cantilever oscillates at a distance from the sample, and van der Waals forces affect oscillation frequency). Electrical measurements of the sample can also be made with AFM in different modes.

In conventional AFM systems, a tip is attached to a cantilever, and the cantilever in turn is attached to a handle. The handle can be controlled by an actuator, which is typically a stack of piezoelectric elements. Information about the sample can be sent back to the AFM system based on deflection of the cantilever, which is measured either through pressure on the piezoelectric stack or by shining a laser on the back of the cantilever adjacent the tip and measuring angle of deflection of the reflected beam.

A common type of sample that is characterized by AFM is a semiconductor wafer, such as a photovoltaic wafer. Surface topography, hardness, and other features can be measured by AFM. A map of these characteristic can be generated by moving the AFM tip across the sample. Although many time- and frequency-domain techniques have been used to probe charge transport dynamics, no instrument currently available provides the ability to probe at the micro/nano scale with sufficiently fast temporal response to understand the underlying physics of carrier dynamics (e.g., carrier recombination, photo-generation, charge transport mechanism and collection), and improve materials and processes for lower cost, higher performance solar cells.

In recent years, perovskite solar cells have attracted interests of researchers across the globe for their extensive advancement within a short period. Efficiency of research-cell perovskites of over 20% have been achieved, many of which can be manufactured or processed with cheap materials compared to conventional crystalline silicon, CIGS, or GaAs cells with comparable efficiencies. The most studied perovskite for the solar cell application is methyl-ammonium lead triiodide ($CH_3NH_3PbI_3$), which can be easily solution processed. Typically, $CH_3NH_3PbI_3$ thin film in planar solar cells are polycrystalline in nature having mean grain sizes ranging from nanometer size to several micrometers. Solution based processing of perovskite thin film leads to variation in defects, orientation and crystallinity within grains of the same $CH_3NH_3PbI_3$ film. As a result, local properties of $CH_3NH_3PbI_3$ film are likely to be variable that cannot be identified at macroscopic level of the device characterization. Despite numerous applied researches, there still exists lack of rigorous experimental studies in understanding the fundamental local properties of perovskites in nanoscale regimes. So far an explicit determination of the local charge carrier behaviors in these materials is absent. Local variations at such small scale cannot be studied using conventional AFM probes for this and other materials due to limitations on spatial resolution and temporal resolution of AFM.

SUMMARY

According to an embodiment, a system for detecting local charge carrier dynamics includes an atomic force microscope system having a conductive tip, an electrically isolated sample holder defining an aperture, an optical source configured to direct light through the aperture and towards the sample, a function generator configured to drive the optical source and provide a coordinated voltage to a sample positioned on the sample holder and adjacent to the tip, and output signal of tip is sent to external preamplifier through a bypass circuit directly to collect analog data corresponding to charge recombination and transfer.

In embodiments, the sample holder can be electrically isolated from ground by plastic washers. The optical source can be a laser. The laser can be tunable to a wavelength corresponding to a bandgap of an expected sample. The system can also include an environmental control chamber configured to house the atomic force microscope, the sample holder, and the sample.

The system can also include a frequency response analyzer configured to receive a signal from the atomic force microscope, a high bandwidth oscilloscope configured to receive the analog data corresponding to charge recombination and transfer from the bypass circuit, a processor configured to generate a local mobility map, a local carrier lifetime map, a local carrier density map, and a nanoscale impedance map based on the combination of the signal from the atomic force microscope and the bypass circuitry.

According to another embodiment, a method for measuring the electrical properties of a sample includes providing an atomic force microscope system having a conductive tip, providing an electrically isolated sample holder defining an aperture, placing the sample on the sample holder adjacent to the aperture, directing an optical source such that it emits a light beam towards the aperture and towards the conductive tip, driving the optical source by a function generator, providing a voltage at the sample by the function generator, wherein the voltage is coordinated with the presence of absence of the light beam at a location on the sample adjacent to the tip, and collecting analog data corresponding to charge recombination and transfer from the sample via a bypass circuit directly electrically connected to the tip.

In embodiments, the sample holder can be electrically isolated from ground by plastic washers. The optical source can be a laser tunable to a wavelength corresponding to a bandgap of the sample. The method can include controlling an environmental control chamber that houses the atomic force microscope, the sample holder, and the sample.

The method can include receiving a signal from a frequency response analyzer, receiving the analog data corresponding to charge recombination and transfer from the bypass circuit at a high bandwidth oscilloscope, and generating a local mobility map, a local carrier lifetime map, a local carrier density map, and a nanoscale impedance map at a processor based on the combination of the signal from the atomic force microscope and the bypass circuitry.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 4A-4D depict contact mode AFM topography of a $CH_3NH_3PbI_3$ perovskite film and contour plot mapping of local charge carrier lifetime and transport time in 100 nm×100 nm area;

Figure 1:
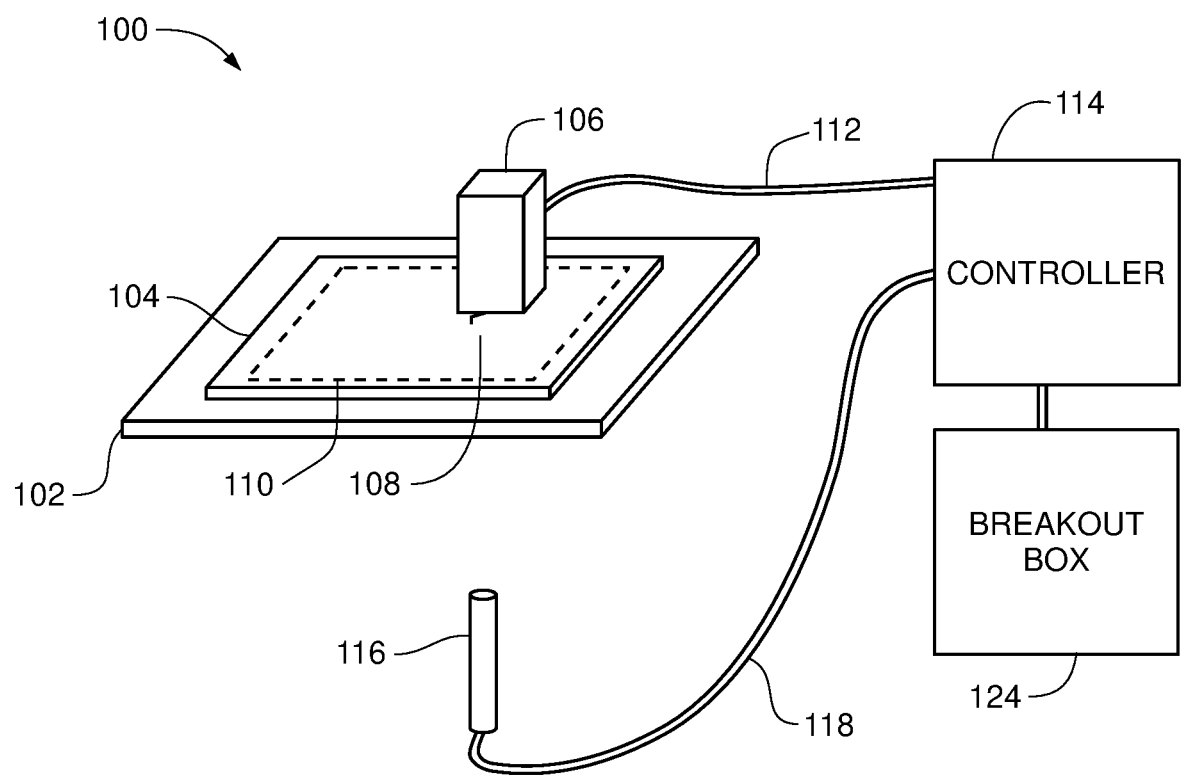
FIG. 1 is a schematic view of a system for measuring characteristics of a sample according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

While mechanical aspects of semiconductor devices can be determined using conventional atomic force microscopy (AFM) systems, electronic attributes have remained more difficult to measure. Electronic attributes can include charge carrier dynamics, carrier density, transport/recombination lifetimes, diffusion length, mobility, and recombination rates in a wide variety of photovoltaic materials and other semiconductor devices. Existing AFM devices typically have a circuit bandwidth of 100 kHz or lower, such that recombination, which often happens in a fraction of this time, cannot be observed. Improvements described herein to the spatial resolution, as well as temporal resolution of current-voltage characteristics, during measurement during in situ heating and cooling, for example. These capabilities facilitate identification of morphological changes in films that occur during fabrication process or other changes in conditions. In general, systems described herein more quickly and accurately detect morphology changes related to charge generation, transport, and recombination to identify optimal processing conditions or other information of interest for developing next-generation solid state devices.

Relatively new technologies, such as perovskite, dye-sensitized cells, organic electronic devices, organic tandem solar cells, inorganic solar cells (such as CZTSSe), and quantum dot solar cells have emerged as serious competitors to silicon-based cells, experiencing rapid increases in efficiency in the 2000s and 2010s. Additionally, improvements to silicon cells (such as heterojunction intrinsic thin layer) often involve complex new designs and electronic functionality that cannot be adequately measured with conventional AFM. As photovoltaic devices diversify and specialize, measurement of electronic attributes of those films becomes more important. For example, perovskite films rapidly deteriorate in the presence of oxygen or water, and new advances (such as the addition of potassium or cesium) can improve stability. Likewise, the effect of environmental conditions during perovskite formation remains relatively unexplored due to the limitations of conventional measurement systems.

Systems described herein include integrated measurement system that can probe charge carrier dynamics and map carrier density, transport/recombination lifetimes, diffusion length, mobility, and recombination rates with high spatial and temporal resolution in a wide variety of photovoltaic materials and devices based on a modified conductive AFM (C-AFM) scanner head integrated with modulated bias hardware such as a function generator, frequency response analyzer, and/or modulated laser source.

FIG. 1 is a perspective view of characterization system 100 according to an embodiment. Characterization system 100 is an AFM-based instrumentation integrated with bias modulated hardware to probe local charge carrier dynamics in nanostructured and disordered materials with high spatial and temporal resolution. For example, in embodiments system 100 is capable of mapping local charge carrier dynamics in nanoscale spatial resolution and temporal resolution in nanosecond to sub-microsecond temporal resolution.

Characterization system 100 detects at least four characteristics at this scale. First, characterization system 100 detects local charge carrier mobility and concentration, for example by using Local Charge Extraction by Linearly Increasing Voltage (L-CELIV) and/or Local Photo)CELIV (LP-CELIV) techniques. Second, characterization system 100 measures local impedance, for example using Nanoscale Impedance Microscopy or Spectroscopy. Third, characterization system 100 detects charge carrier loss and its mapping using, for example, local charge extraction (L-CE). Fourth, characterization system 100 detects local charge carrier lifetime, local charge transport time and recombination rates using, for example, Local Intensity Modulated Photocurrent and Photovoltage Spectroscopy (L-IMPS or L-IMVS).

Characterization system 100 includes a base 102 that is shown attached to a sample 104. System 100 further includes AFM head 106, which includes tip 108 that can be moved across a surface 110 of sample 104. System 100 further includes a cable 112 that electrically connects AFM head 106 to a controller 114 and signal from the controller is collected through a breakout box 124 via cable 122. Likewise, an optical source 116 is coupled to function generator 120 with a cable 118.

Base 102 can be attached to sample 104, such as with clamps or screws (not shown in FIG. 1), to prevent unwanted relative movement therebetween. Likewise, base 102 and AFM head 106 can be mechanically coupled to prevent unwanted relative movement therebetween. In some embodiments, weights or other heavy or massive objects such as a stone pedestal can be attached to substrate 102 to prevent vibrations or other unwanted movements by increasing the inertia of system 100.

Sample 104 is not a part of system 100, but rather the object which is being characterized by system 100. Sample 104 can be an object made of semiconductor material, AFM head 106 and tip 108 form a C-AFM scanner, and like a conventional C-AFM scanner the AFM head 106 and probe 108 scan an area 110 of sample 104. AFM head 106 provides a voltage to the conductive probe 108, and is configured to amplify the electrical response via a preamplifier. Probe 108 can be a conventional AFM probe, made of silicon with a conductive metal (e.g., platinum) coating. Preferably, probe 108 can be a solid metal tip, which does not degrade as quickly during use and therefore provides more consistent readings.

Unlike a conventional system, AFM head 106 further includes bypass circuitry such that the signal from the tip is bypassed and sent to the external preamplifier (not shown in FIG. 1). The bypass circuitry is described in more detail below with respect to FIG. 5.

Controller 114 is configured to communicate with AFM head 106 via cable 112. Controller 114 can send signal to AFM head 106, in embodiments, to control the 3-dimensional position of AFM head 106. AFM head 106 can include piezoelectric materials (not shown) capable of moving at very low speeds and with high levels of accuracy. For example, many AFM systems employ piezoelectric materials to move AFM head 106 in each direction (left-right, front-back, and up-down) relative to the sample. In alternative embodiments, the position of AFM head 106 can be determined by a function generator, as described in more detail below with respect to FIG. 5.

Optical source 116 can be controlled by function generator 120. Optical source, as shown in FIG. 1, is a laser. In alternative embodiments, optical source 116 could be an LED light source, or a light bulb, or any other source of optical signal. In embodiments it may be preferable to focus the light on a particular portion or section of sample 104. Collimated light sources such as lasers can be focused on a region of interest. Diffuse light sources could be used with focusing lenses, mirrors, or other systems (not shown) to direct the optical signal at the desired area. In embodiments it may be preferable to provide optical signal having a particular wavelength or set of wavelengths. LED or laser optical sources 116 can provide sharp peaks of signal at desired wavelengths, or light sources that emit at a range of wavelengths can be filtered to provide a desired color profile.

AFM head 106 is configured to move probe 108 across sample 104 to characterize a surface 110 thereof. AFM head 106 provides a test voltage at each location, and can be driven in coordination with laser optical source 116 such that measurements are taken in a dark environment, in an illuminated environment (i.e., illuminated by optical source 116), or at transitions (e.g., as light is being turned on or off). The electrical response of these test voltages under any or all of these conditions is returned to controller 114 via cable 112. That electrical response can include both a preamplified signal as well as a bypass signal, analog signal. The bypass, analog signal can be provided via a direct connection (e.g., a coaxial coupling) between an external preamplifier and the tip, as shown below with respect to FIG. 5.

The combination of AFM head 106, controller 114, external preamplifier (not shown in FIG. 1) and optical source 116 can generate data with high temporal resolution in light and dark conditions that are not possible or practicable using conventional AFM systems. In embodiments, system 100 can be housed within a climate controlled chamber such that measurements can be made at a specific temperature, humidity, or light level, or at varying levels of each of these factors. The climate controlled chamber can also be purged with an inert gas to prevent changes to the electrical characteristics of the tip and to prevent oxidation or degradation of the tip and any samples measured in system 100. Furthermore, the data collected from system 100 has higher temporal resolution due to the collection of data via a bypass circuit and external preamplifier.

Figure 2A:
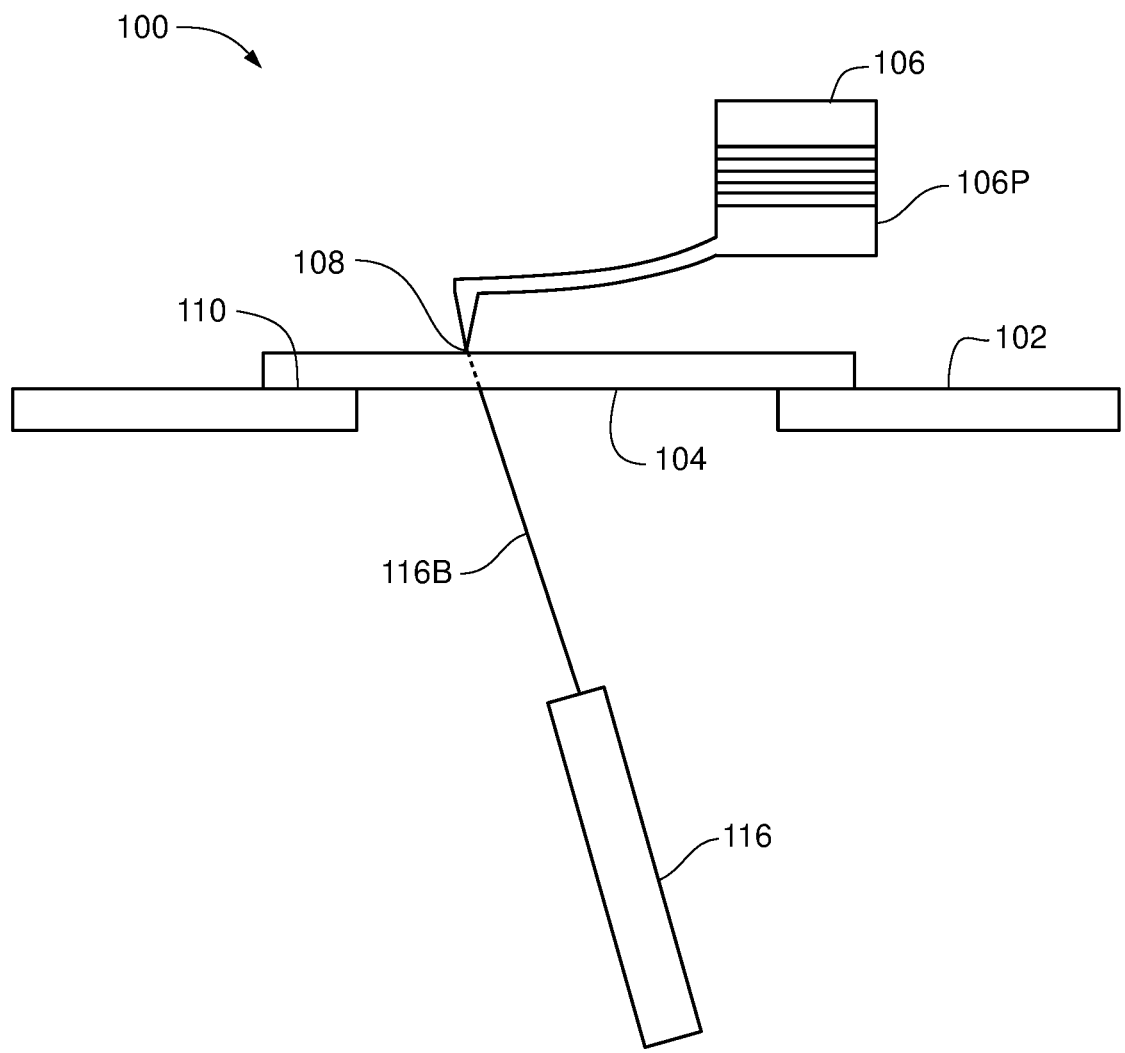
FIG. 2A is a cross-sectional schematic view of a system according to an embodiment, depicting selective illumination of a sample.

FIG. 2A is a cross-sectional view of a system 200 according to an embodiment. System 200 includes several parts that are similar to those previously described with respect to system 100 of FIG. 1. Where similar parts are shown, in FIG. 2 and throughout the rest of the description, those parts are labeled with similar numbers iterated by factors of 100. Thus, substrate 202 of FIG. 2A is similar to substrate 102 of FIG. 1, sample 204 of FIG. 2A is similar to sample 104 of FIG. 1, AFM head 206 of FIG. 2A is similar to AFM head 106 of FIG. 1, probe 208 of FIG. 2A is similar to probe 108 of FIG. 1, and optical source 216 of FIG. 2A is similar to optical source 116 of FIG. 1.

FIG. 2A depicts optical source 216 as a collimated light source such as a laser. In addition, FIG. 2A depicts beam 216B emanating from optical source 216. In the embodiment shown in FIG. 2, beam 216B is directed towards tip 208. In alternative embodiments, beam 216B could be directed towards the bottom of sample 204 such that tip 208 is on the portion of surface 210 directly above the location where beam 216B is incident upon sample 204. In still further embodiments, for example where sample 204 is positioned on a transparent support or layer, beam 216B could be directed towards some point underneath tip 208 but also above the bottom of sample 204, with respect to the orientation shown in FIG. 2.

AFM head 206 includes a stack of piezoelectric components 206P that are configured to raise or lower probe 208, and/or sense mechanical feedback from surface 210 in order to determine the topography thereof. Furthermore, AFM head 206 gathers electrical information from sample 204 by providing test charges and measuring the amount of time until the charge dissipates. In other embodiments, test charge can be provided by a sample clip or electrode (not shown).

Throughout a scanning process, when the tip scans any point the beam 216B from optical source 216 controlled by a function generator (as shown in FIG. 1) shines exactly at that time and the corresponding photoelectric signal is extracted from the tip through breakout box 124 (as shown in FIG. 1). Output from AFM controller is accessed through the breakout box and then signal is transferred to the oscilloscope. Breakout box works as an interface between AFM controller and oscilloscope.

Figure 2B:
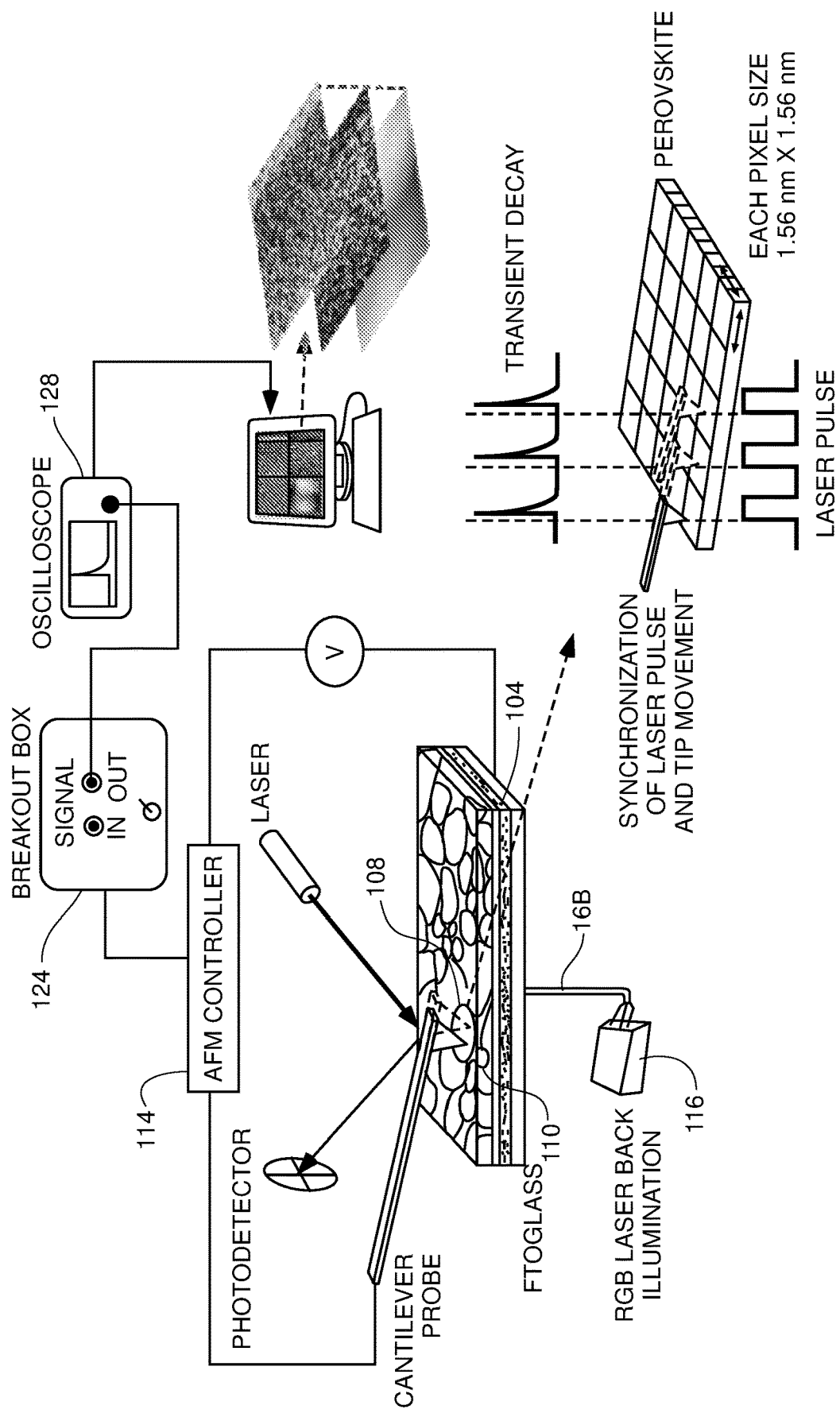
FIG. 2B is a schematic diagram of the system.

FIG. 2B is the schematic where the planar perovskite solar cell was mounted in a conductive AFM (C-AFM) configuration for measuring the local carrier dynamics e.g. local charge carrier life time and transport time. Samples 204 were exposed from underneath to an excitation green laser pulse 216B from a RGB laser 216. Labview software program was used to synchronize laser illumination with tip 208 movement. When the tip 208 scans any point, the laser illuminated exactly on that time and then the signal was extracted from the tip goes to AFM controller 214 (same as shown in FIG. 1 as 114) and then through the breakout box 224 (same as shown in FIG. 1 as 124) to the oscilloscope.

Figure 3A:
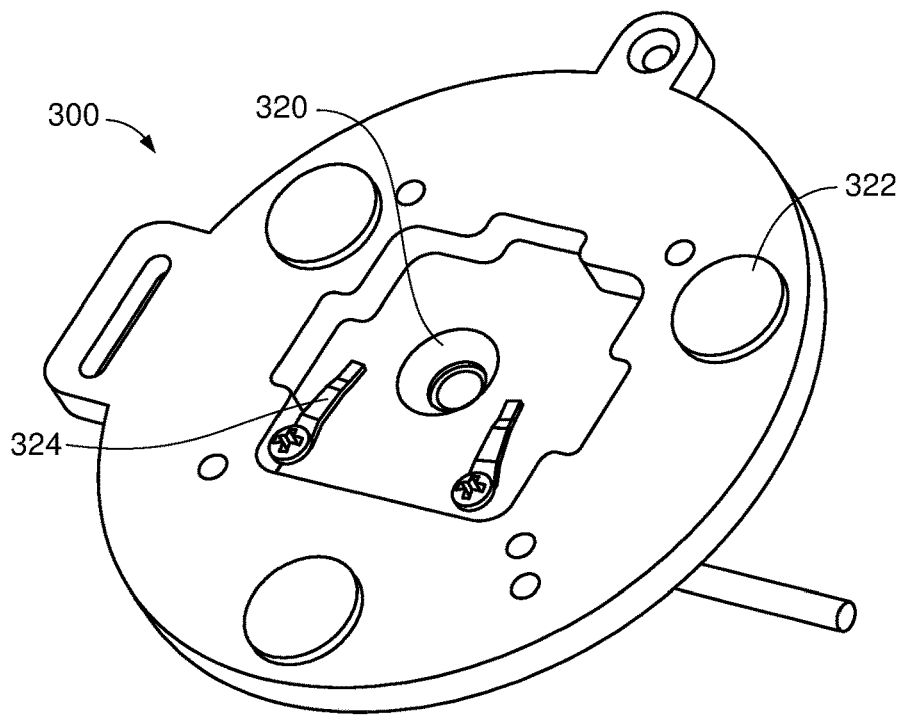
FIGS. 3A-3C are perspective views of a sample holder according to an embodiment.
Figure 3B:
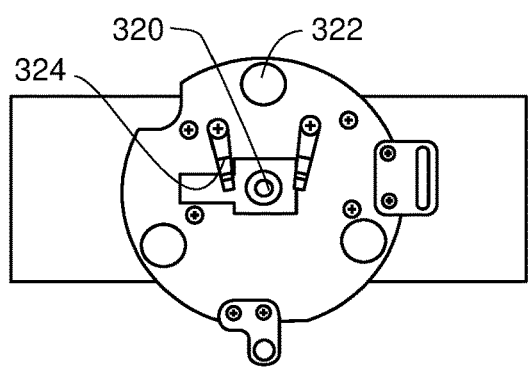
Figure 3C:
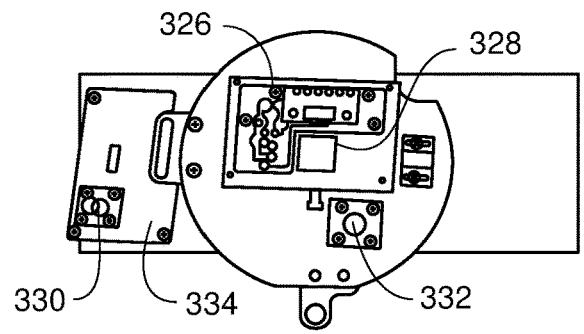

FIG. 3A is a sample holder design 300 according to an embodiment. Sample holder 300 includes aperture 320, magnets 322 to attach sample holder 300 to AFM, sample clip 324 to hold and apply any voltage to sample. Aperture 320 is defined in sample holder 300 to provide a route for light from a light source to reach a sample, as described above with respect to FIG. 2. FIG. 3B is the front view of the sample holder according to the embodiment. FIG. 3C is the rear view of the sample holder. Sample holder 300 includes PCB 326 (contains photodetector circuit and connections to sample clips 324), beam splitter 328, BNC connector 330 for collecting signal from the photodetector and BNC connector 332 to connect AFM tip to external preamplifier as bypass circuit. Back cover 334 to shield the PCB 326 from noise.

FIGS. 4A-4D are magnified images of the topography of a 400 nm×400 nm sample (the detail view indicated as square B in FIG. 4A). Detailed view of a contour plot mappings of local charge carrier lifetime and local charge carrier transport time on topography of 100 nm×100 nm are indicated by square CD shown in FIG. 4B. FIG. 4A is a 5 μm×5 μm contact mode AFM topography image of a sample as measured by the system. It will be appreciated that in alternative embodiments, differently sized or shaped samples can be used. FIG. 4B shows the magnified view 400 nm×400 nm of topography of the sample indicated by square B in FIG. 4A. FIGS. 4C and 4D are contour plot mappings of local charge carrier lifetime and transport time respectively on topography of 100 nm×100 nm indicated by square CD in FIG. 4B. For FIGS. 4A-4D, the sample is a perovskite film. Notably, although the depiction in FIGS. 4C and 4D are grayscale images, the images can be rendered in color by system 100 with legend bar 600 depicted at the right edge of the image to aid in the interpretation of the colors displayed in the associated image. For example, the top end of legend bar 600 can be dark red, indicating corresponding regions in the image having local charge carrier lifetime or local charge carrier transport time of about $8 \times 10^{-3}$ ms, extending through lighter shades of red and orange indicating corresponding values in the image of about $7 \times 10^{-3}$ ms and $6 \times 10^{-3}$ ms respectively, shades of yellow representing about $5 \times 10^{-3}$ ms, shades of green representing about $4 \times 10^{-3}$ ms, and steadily darker shades of aquamarine and blue for values representing from about $3 \times 10^{-3}$ ms through $1 \times 10^{-3}$ ms at the bottom of legend bar 600. In this way, colors displayed in the images of FIGS. 4C and 4D can be interpreted to identify local charge carrier lifetime and local charge carrier transport time for all regions in the image on a nanoscale.

The surface of the perovskite film can be divided into a number of squares, and each square can be subdivided into points. In FIGS. 4A-4D, square includes a 64×64 array of collection points, such that the mapping is done in 64×64 pixels with high spatial resolution of 1.56 nm. Other mapping patterns or resolutions can be selected without departing from the scope of the invention.

The tip of a probe (e.g., probe 102 or 202 described above) can be placed in each point. The transient photovoltage and photocurrent decay can then be measured locally at each point of the film using a C-AFM tip and recording the data by an oscilloscope. During these measurements, an optical source (e.g., 116 or 216 described above) can be used to illuminate the sample from the bottom. In embodiments, the optical source can be pulsed with a desired duty cycle and frequency to measure the decay or transit of charge through the sample (examples of individual decay curves are shown and described in more detail with respect to FIGS. 7A-D). For example, a 20% duty cycle and a 1 KHz frequency can be used in one embodiment. In other embodiments (local Photo-CELIV, nanoscale impedance mapping), a frequency sweep by frequency response can range between 1 Hz and 1 MHz, and pulse widths from a function generator driving the optical source can range from 50 ns to 500 ns, depending on the sample and measurements desired.

In FIGS. 4A-4D, it can be seen that the local lifetime and transport time mapping of carriers is different from point to point. This is due to compositional difference between grain boundary and grain of perovskite film. Since grain boundary consists of defects and traps in semiconductor so the local charge carrier life time and transport time mapping shows variation for the same materials.

Figure 5:
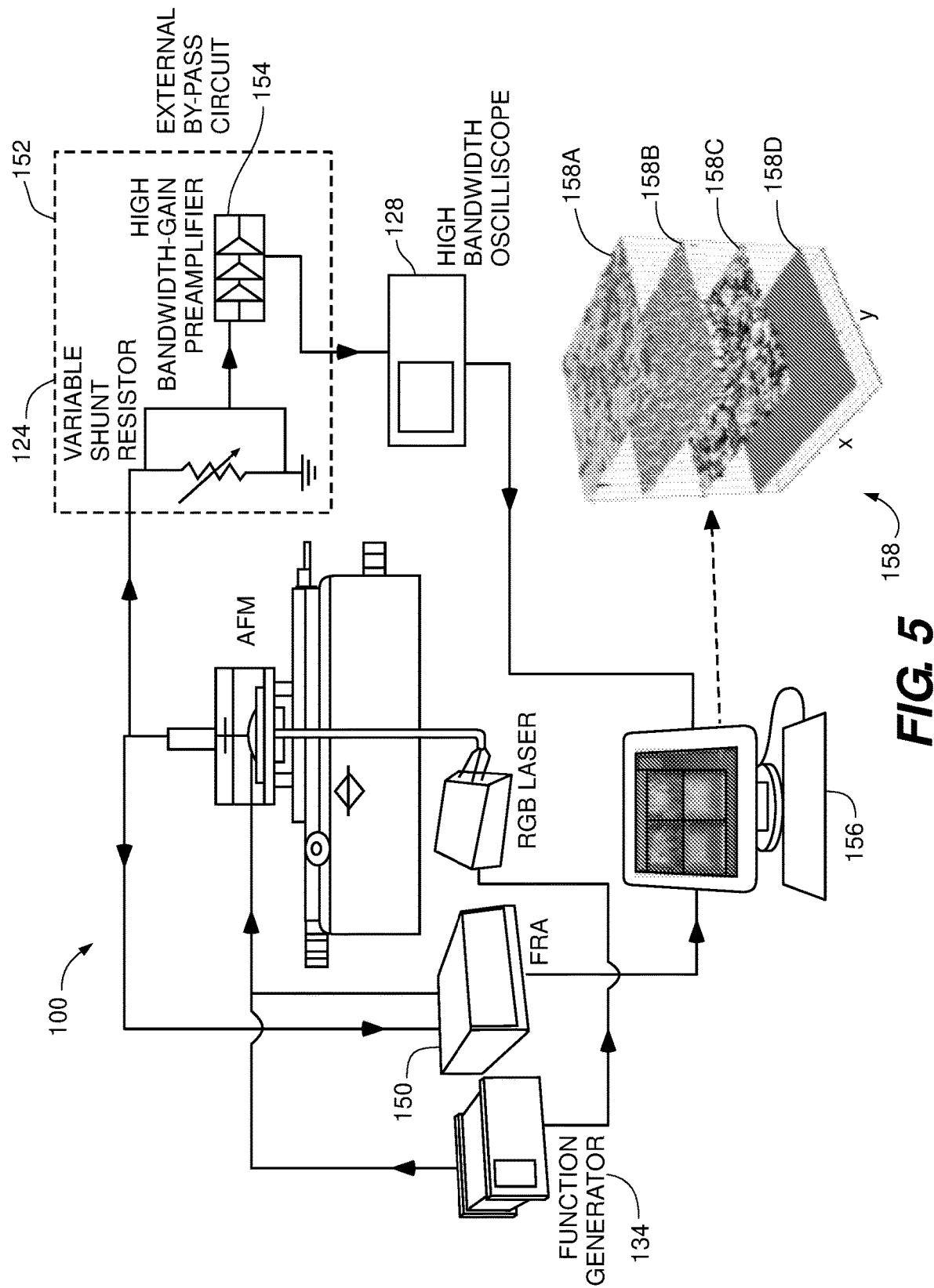
FIG. 5 is a schematic of a system according to an embodiment.

FIG. 5 depicts a schematic of a system 500 and connected components, according to an embodiment. System 500 outputs data to a frequency response analyzer (FRA) 524 and also to bypass circuitry 526. Signal at the bypass circuitry 526 is routed through a high bandwidth-gain preamplifier to a high bandwidth oscilloscope 528. Signal at the frequency response analyzer 524 and signal from the high bandwidth oscilloscope 528 are combined at a computer 530 to form an output 532. Depending on the type of measurement and process, it will give different charge carrier dynamics separately. Different outputs are local mobility map 532A, local carrier lifetime map 532B, local carrier density map 532C, and nanoscale impedance map 532D. These outputs from common locations will be analyzed together to better understand the charge carrier dynamics and develop high performance materials for various physical and applied science related applications.

Bypass circuitry 152, which includes preamplifier 154, has been designed to overcome the obstacles of commercially available AFM circuit bandwidth. The new AFM tool with the bypass circuitry is designed to resolve charge carrier dynamics at fast (sub-ps) time scales (high temporal resolution) in materials having fast transient response which is not possible using the commercial AFMs. In particular, bypass circuitry 152 has a co-axial subminiature version A cable or similar directly connected to the AFM probe. This cable in turn is connected to a high bandwidth (>200 MHz) external preamplifier to get fast (sub-ps) time scale response. To increase gain, the current can be shunted across high precision resistors before being routed to the preamplifier 154. The disclosed AFM instrumentation is also capable of resolving the charge carrier dynamics at high spatial resolution.

In order to provide data regarding dark and light states quickly and accurately, the external modulated bias system is capable of generating fast electrical and optical bias modulation and collecting modulated current output signals. The voltage and optical bias can be provided by function generator 534 and modified based on output from FRA 524. For local charge extraction and local charge carrier mobility mapping, an arbitrary function/waveform generator can be used with two outputs that can deliver short pulses to the optical sources (e.g., 116 and 216, and shown in FIG. 5 as an RGB laser configured to emit at a wavelength corresponding to a bandgap or bandgaps of interest in a particular sample) while providing voltage ramp to the sample to effectively extract the generated charges and measure decay with the oscilloscope 528. Throughout a scanning process, when the tip scans any point, the beam 216B from optical source 216 controlled by a function generator (as shown in FIG. 1) shined exactly on that time and then the signal is extracted from the tip through breakout box 124 (as shown in FIG. 1). As a result shinning of the laser synchronized with the movement of the tip. Synchronization between inputs and outputs can be achieved using appropriate trigger functions available on each of these components, in embodiments.

Figure 6A:
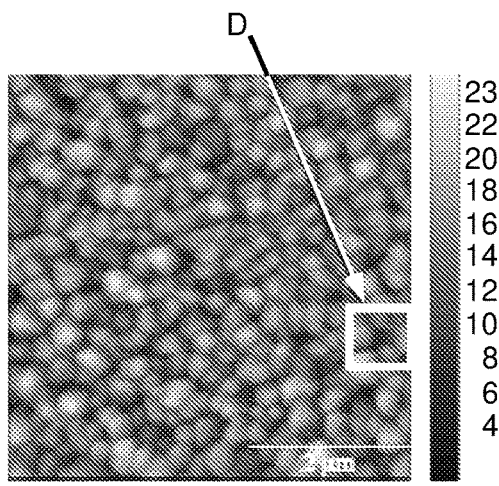
FIGS. 6A-6D are contact mode AFM topography of the $CH_3NH_3PbI_3$ perovskite film, Magnified image of topography (indicated by square (800 nm×800 nm)) and contour plot mapping of local charge carrier lifetime and local charge carrier transport time.
Figure 6B:
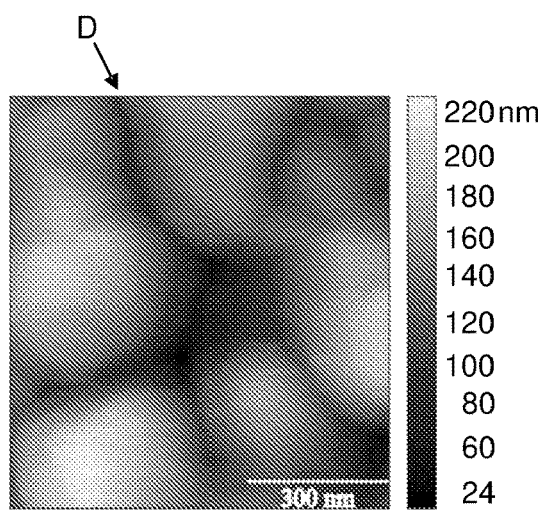
Figure 6C:
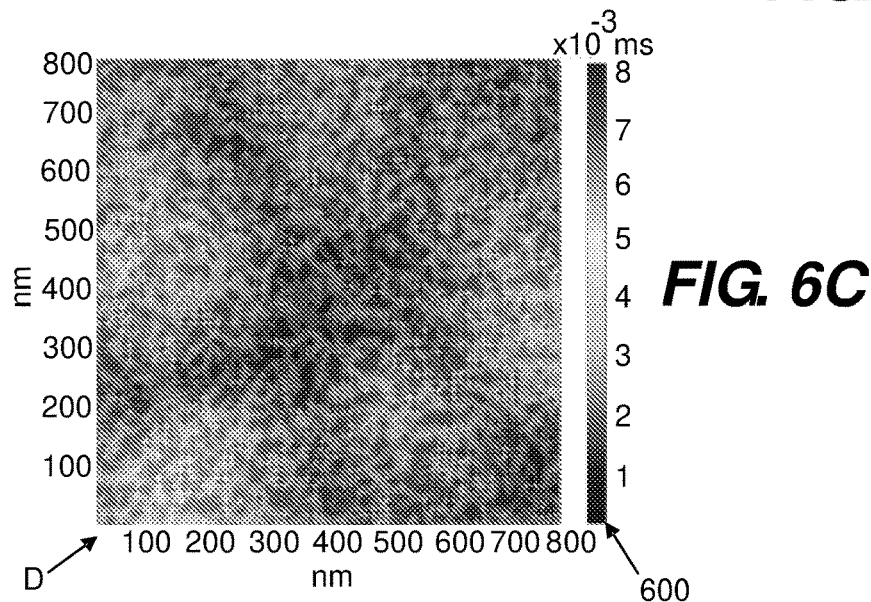
Figure 6D:
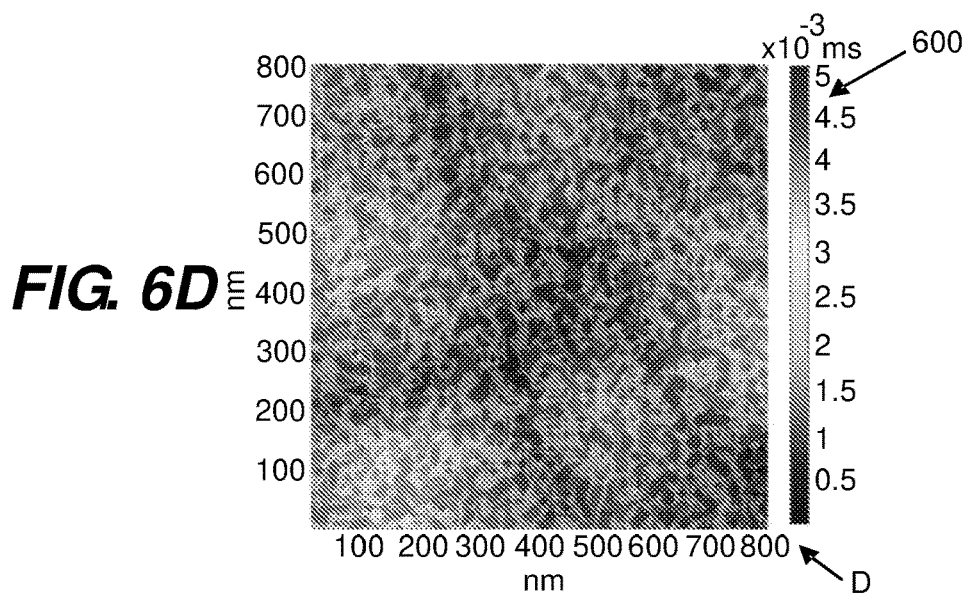

FIG. 6A shows a 5 μm×5 μm contact mode AFM image of a perovskite thin film. Topography of the perovskite thin film (indicated by red circle in FIG. 6A) is magnified to an area of 800 nm×800 nm as shown in FIG. 6B having clear image of different microstructural regions on the perovskite film. FIGS. 6C and 6D are contour plot mappings of local charge carrier lifetime and transport time respectively on topography of 800 nm×800 nm.

Figure 7A:
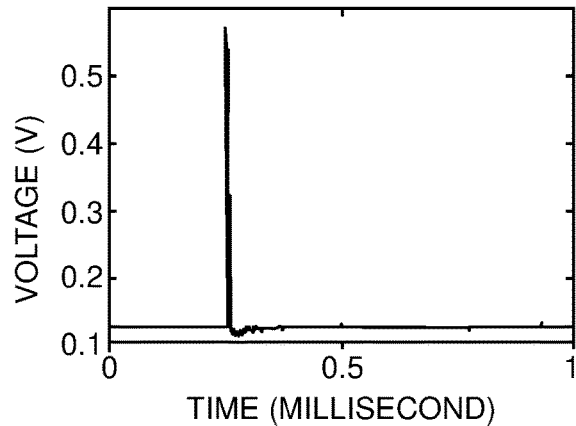
FIGS. 7A-7D are transient photovoltage and photocurrent decay curves at different points on a perovskite film and the corresponding fitted curves with a mono exponential decay function.
Figure 7B:
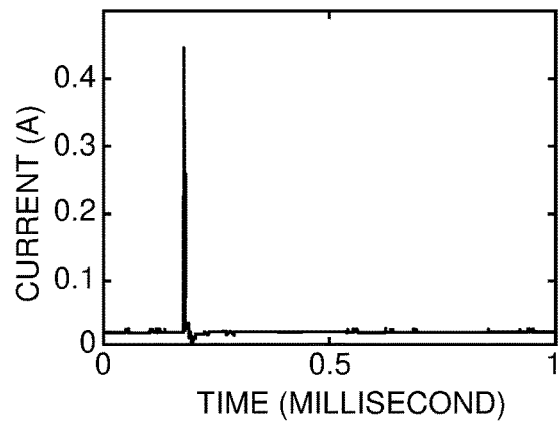
Figure 7C:
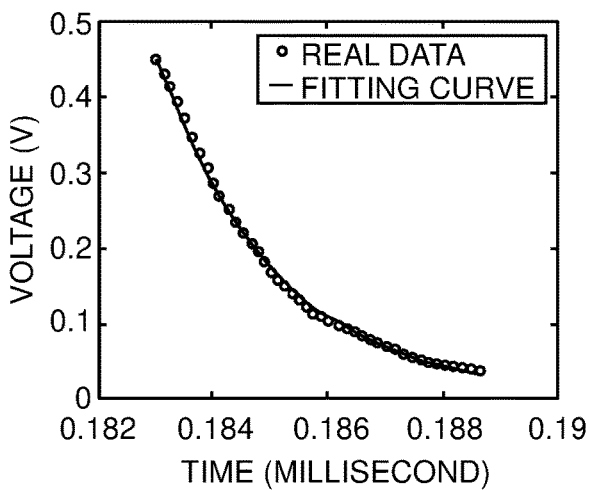
Figure 7D:
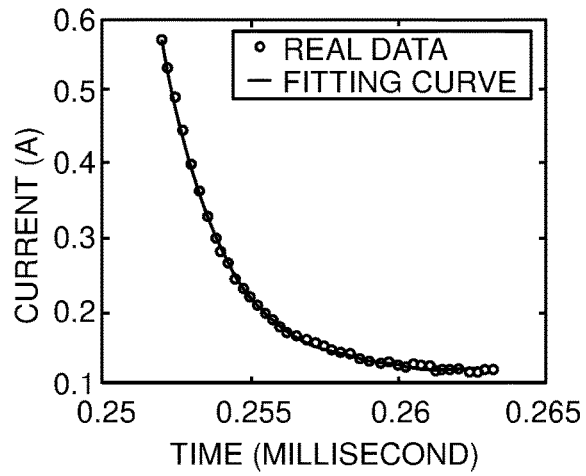

FIG. 7A and FIG. 7B show real-time curves of local charge carrier dynamics e.g. transient photovoltage and photocurrent decay. As depicted by these two figures in contrast, photovoltage and photocurrent decay can occur over a different amount of. Decay curves were then fitted using mono-exponential decay function and were shown in FIG. 7C and FIG. 7D.

Figure 8:
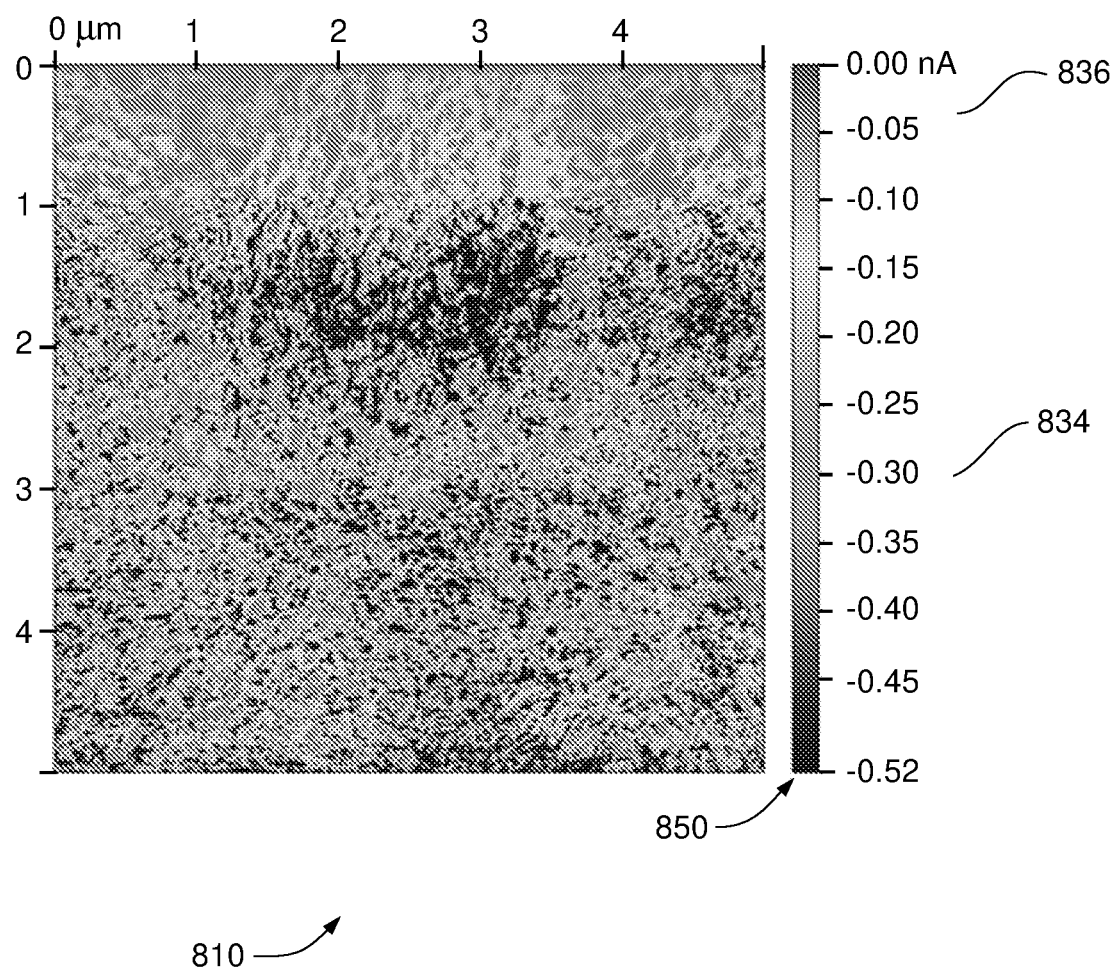
FIG. 8 is a current sensing map of a perovskite film.

FIG. 8 is a current sensing image of a prepared perovskite thin film, measured with a system according to an embodiment described above. The map shown includes a surface 810 that is measured partially during a period of illumination and partially during a period when the sample is not illuminated. For example, surface 810 can be measured using C-AFM systems described above in which the optical source is targeted towards the sample during a first time period while measurements are being taken, and in which the optical source is turned off during a second time period while measurements are being taken. These two time periods correspond to the measurements taken in the first region 834 and second region 836, respectively. As shown in FIG. 8, the first region 834 generally corresponds to higher current levels of up to about 0.5 nA, whereas the second region 836 corresponds generally to lower current levels of about 0.1 nA or less. Thus the effect of illumination upon the perovskite film is shown to be an increase in current.

Figure 9A:
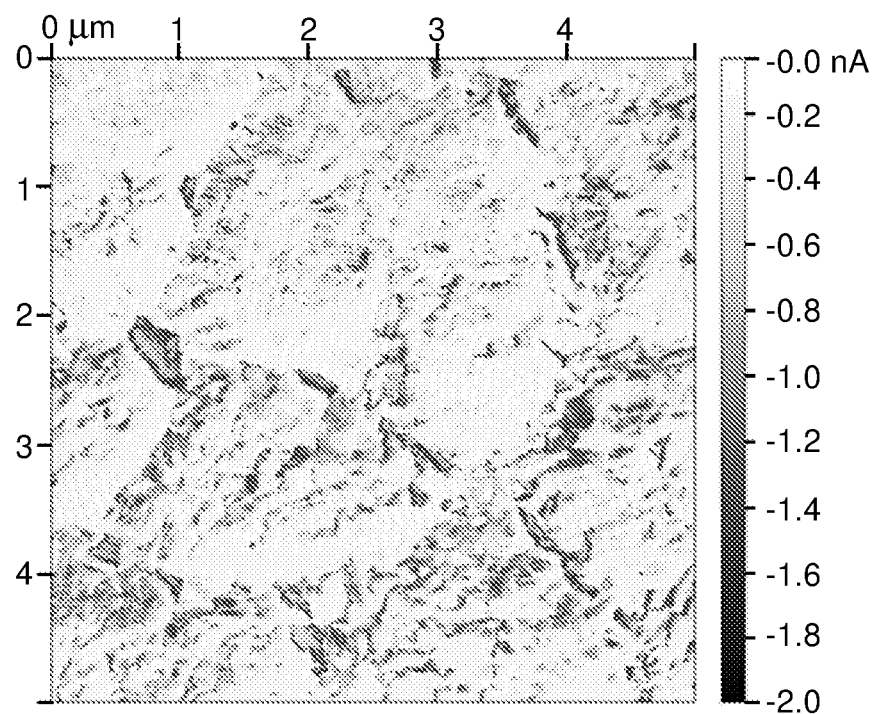
FIG. 9A is a current sensing map of a perovskite film taken in the dark.
Figure 9B:
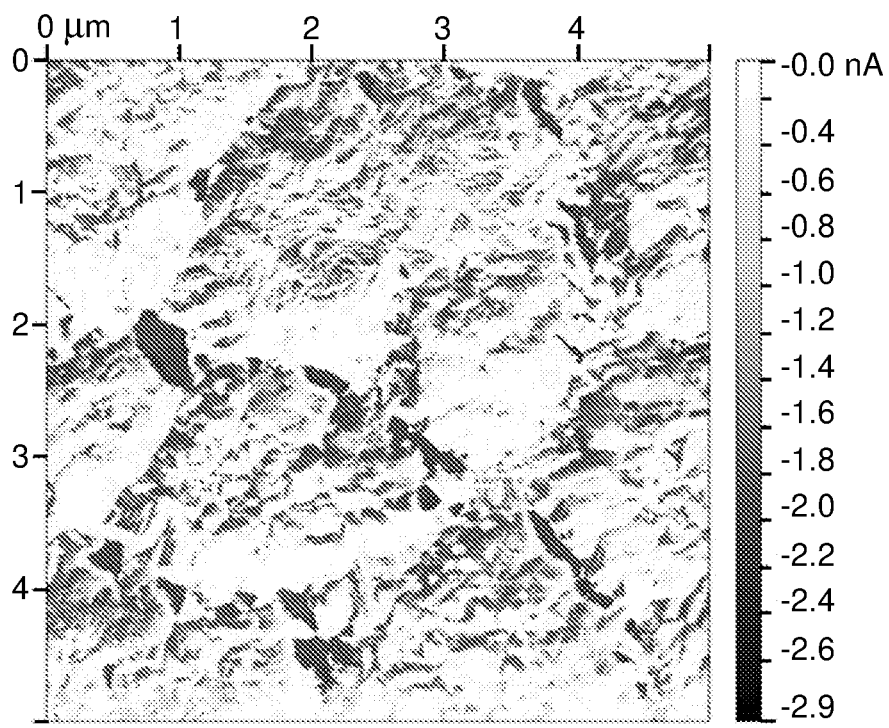
FIG. 9B is a current sensing map of a perovskite film illuminated from the bottom with a laser light source.

FIGS. 9A and 9B similarly show a difference between dark (FIG. 9A) and illuminated (FIG. 9B) samples, with increased current associated with the illuminated sample.

Figure 10A:
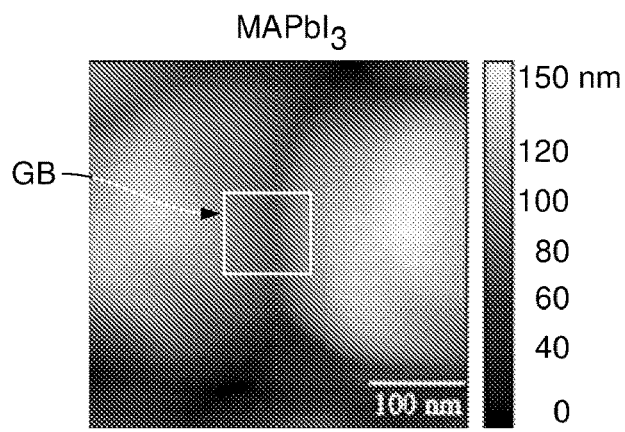
FIG. 10A depicts a 400 nm × 400 nm contact mode AFM image of a methyl ammonium lead iodide (MAPbF) perovskite thin film with a portion GB designated.
Figure 10B:
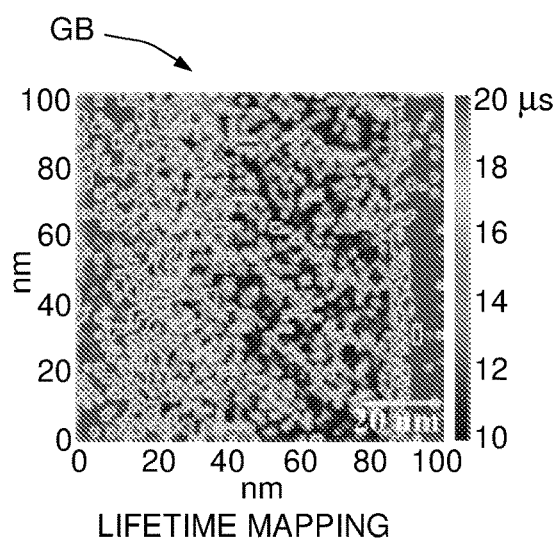
FIG. 10B depicts local charge carrier lifetime mapping of the portion GB of FIG. 10A.
Figure 10C:
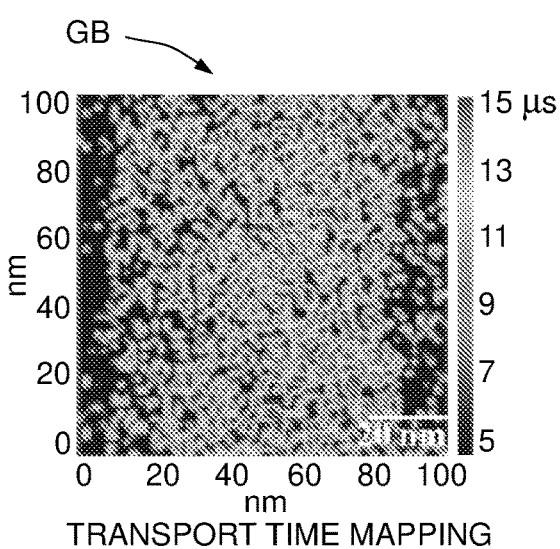
FIG. 10C depicts transport time mapping of the portion GB of FIG. 10A.
Figure 10D:
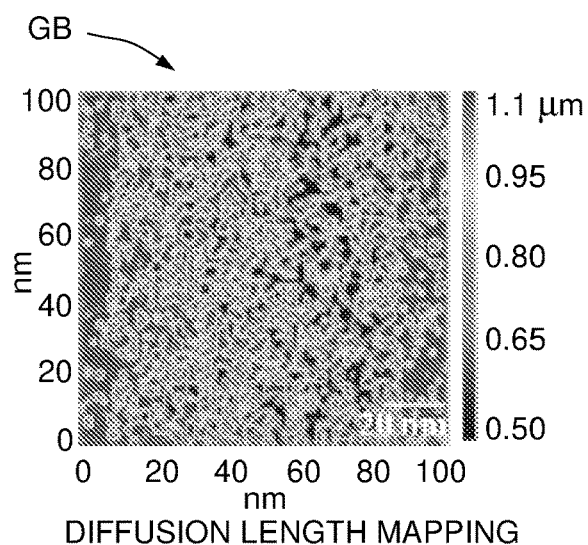
FIG. 10D depicts diffusion length mapping of the portion GB of FIG. 10A.

FIG. 10A depicts a 400 nm×400 nm contact mode AFM image of a methyl ammonium lead iodide (MAPbI$_3$) perovskite thin film. A portion GB measuring 100 nm×100 nm of the image is designated therein. FIG. 10B depicts local charge carrier lifetime mapping of the portion GB of FIG. 10A in microseconds displayed by the system. FIG. 10C depicts transport time mapping of the portion GB of FIG. 10A in microseconds displayed by the system. And FIG. 10D depicts diffusion length mapping of the portion GB of FIG. 10A in micrometers displayed by the system.

Figure 10E:
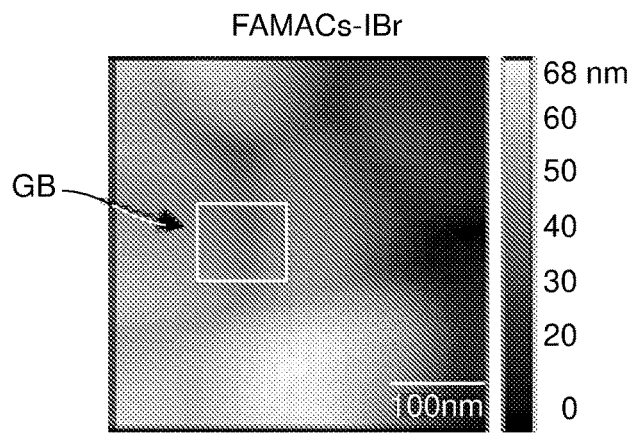
FIG. 10E depicts a 400 nm × 400 nm contactmode AFM image of a mixed-cation (cesium & formamidinium) and halide (bromine) (i.e. FAMACs-IBr) perovskite thin film with a portion GB designated.
Figure 10F:
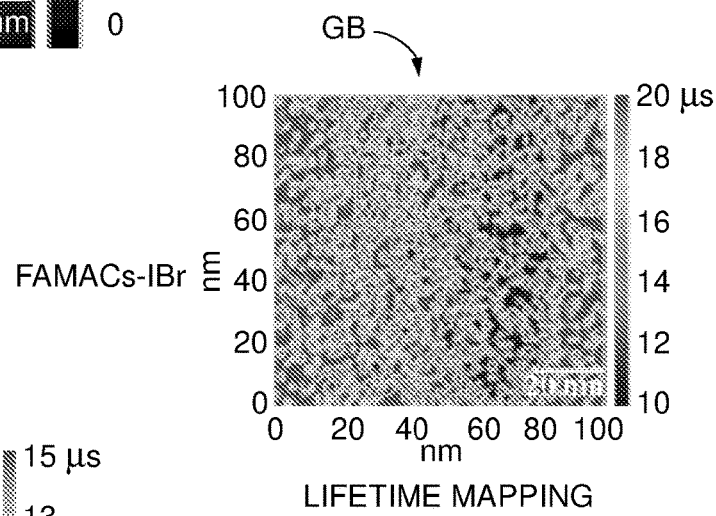
FIG. 10F depicts local charge carrier lifetime mapping of the portion GB of FIG. 10E.
Figure 10G:
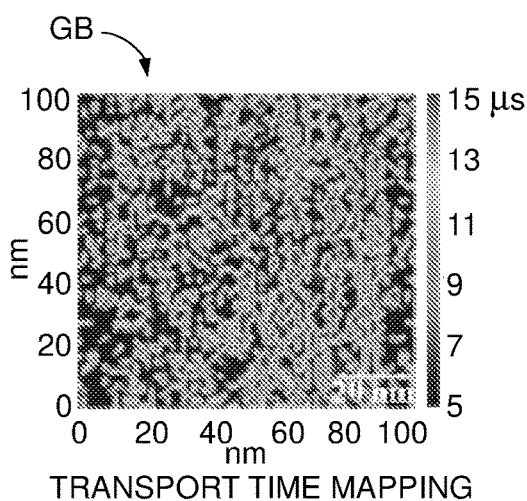
FIG. 10G depicts transport time mapping of the portion GB of FIG. 10E.
Figure 10H:
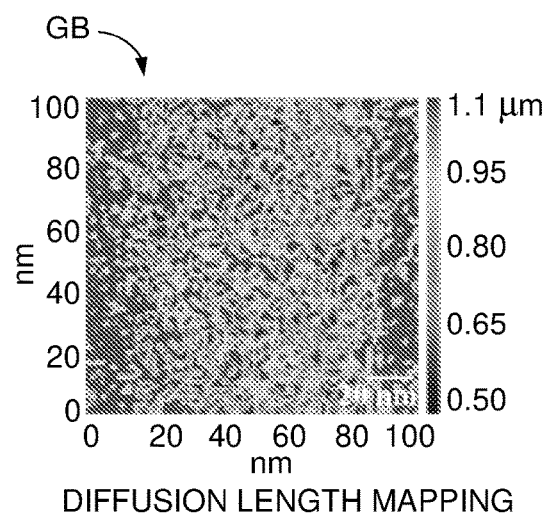
FIG. 10H depicts diffusion length mapping of the portion GB of FIG. 10E.

FIG. 10E depicts a 400 nm×400 nm contact mode AFM image of a mixed-cation (cesium & formamidinium) and halide (bromine) (i.e. FAMACs-IBr) perovskite thin film. A portion GB measuring 100 nm×100 nm of the image is designated therein. FIG. 10F depicts local charge carrier lifetime mapping of the portion GB of FIG. 10E in microseconds as displayed by the system. FIG. 10G depicts transport time mapping of the portion GB of FIG. 10E in microseconds as displayed by the system. And FIG. 10H depicts diffusion length mapping of the portion GB of FIG. 10E in micrometers as displayed by the system.

Figure 11A:
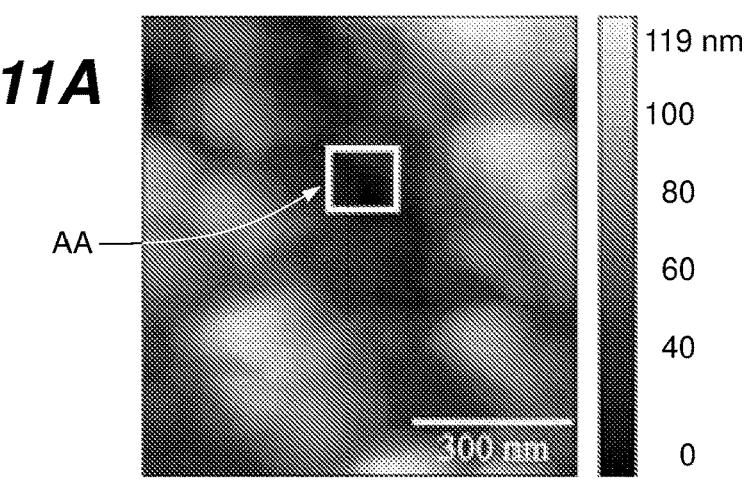
FIG. 11A is a contact mode AFM image of the topography of an 800 nm × 800 nm portion of a perovskite thin film having a lead iodide (PbE) concentration of 0.56 M (PbF), with portion AA designated.
Figure 11B:
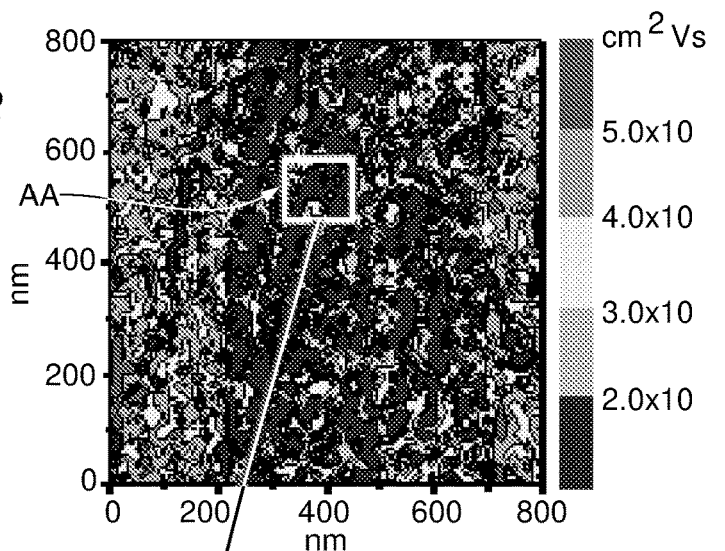
FIG. 11B depicts local charge mapping of FIG. 11A.
Figure 11C:
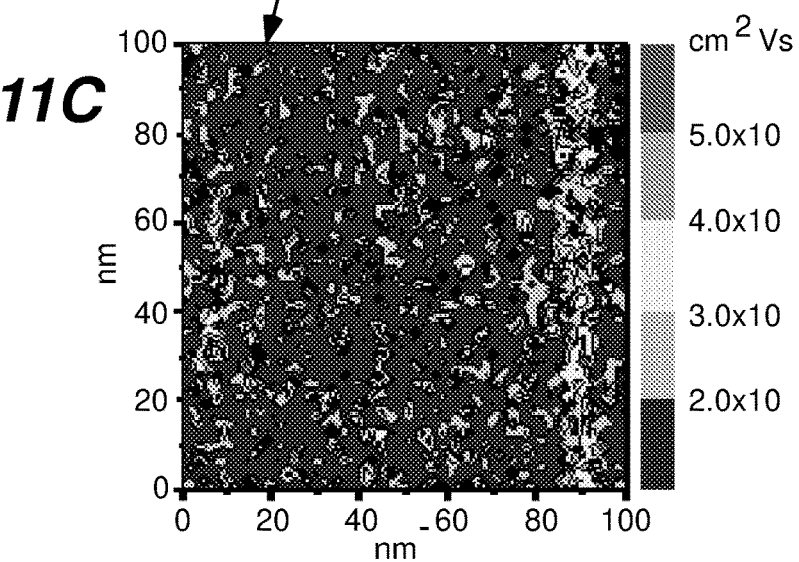
FIG. 11C depicts local charge mapping of portion AA of FIG. 11A.
Figure 11D:
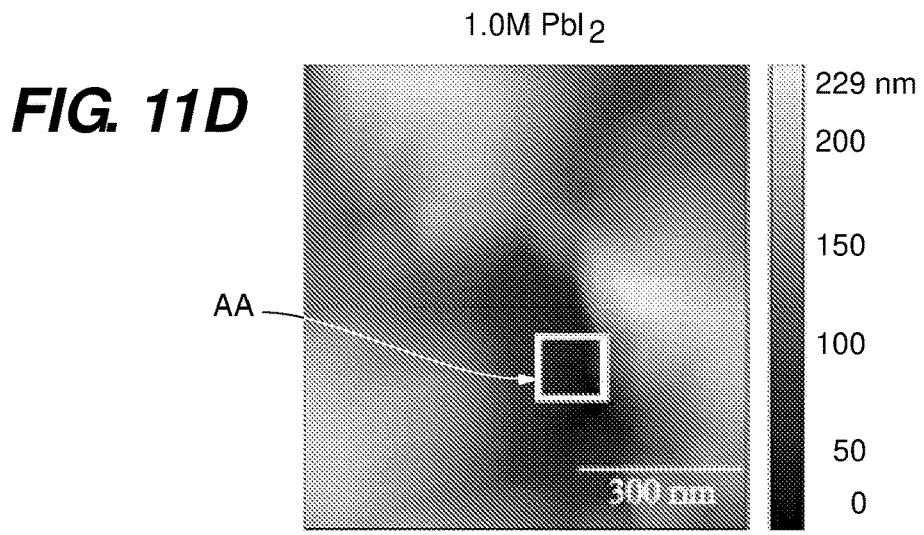
FIG. 11D is a contact mode AFM image of the topography of an 800 nm / 800 nm portion of a perovskite thin film having a lead iodide (PbF) concentration of 1.0 M (PbF), with portion AA designated.
Figure 11E:
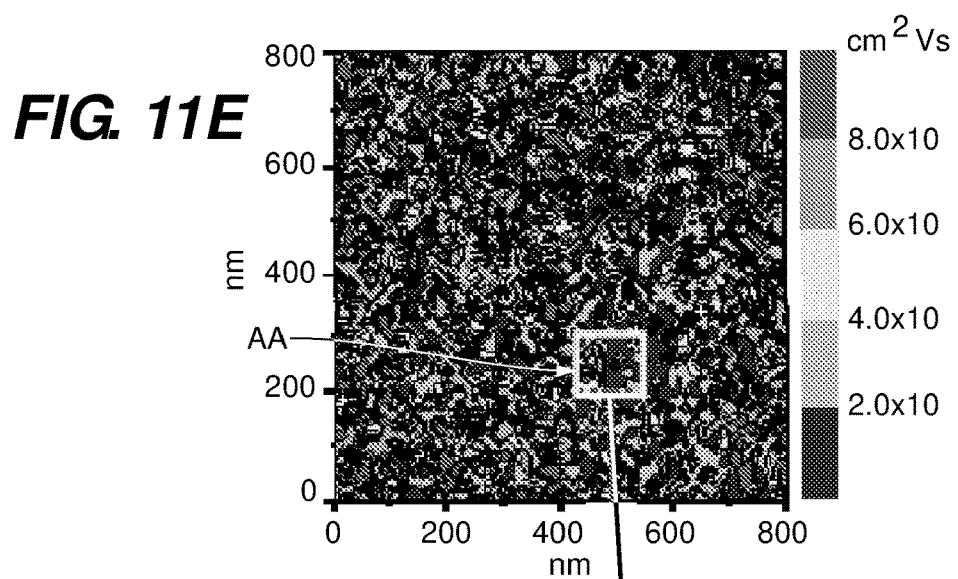
FIG. 11E depicts local charge mapping of FIG. 11D.
Figure 11F:
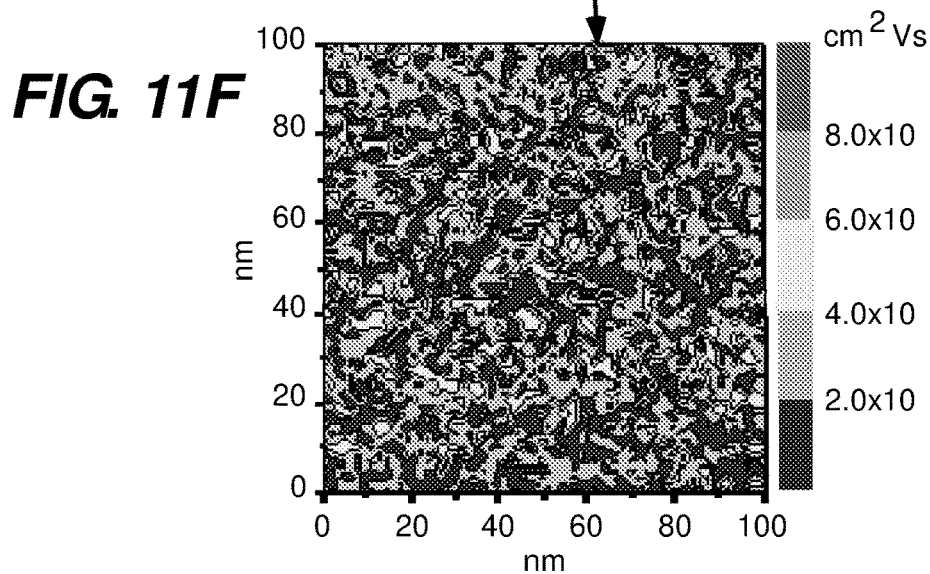
FIG. 11F depicts local charge mapping of portion AA of FIG. 11D.
Figure 11G:
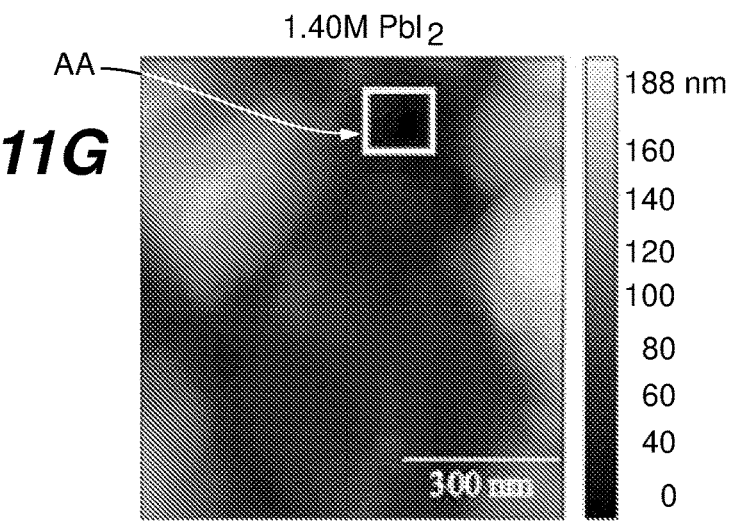
FIG. 11G is a contact mode AFM image of the topography of an 800 nm / 800 nm portion of a perovskite thin film having a lead iodide (PbF) concentration of 1.4 M (PbF), with portion AA designated.
Figure 11H:
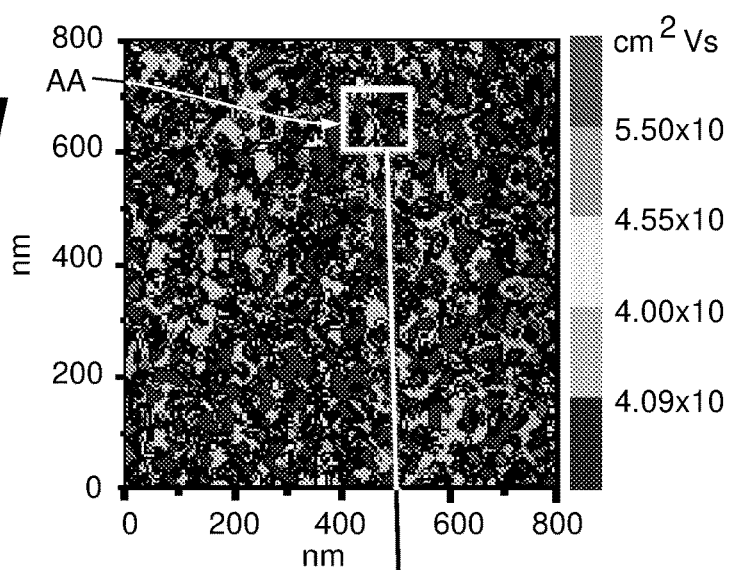
FIG. 11H depicts local charge mapping of FIG. 11G.
Figure 11I:
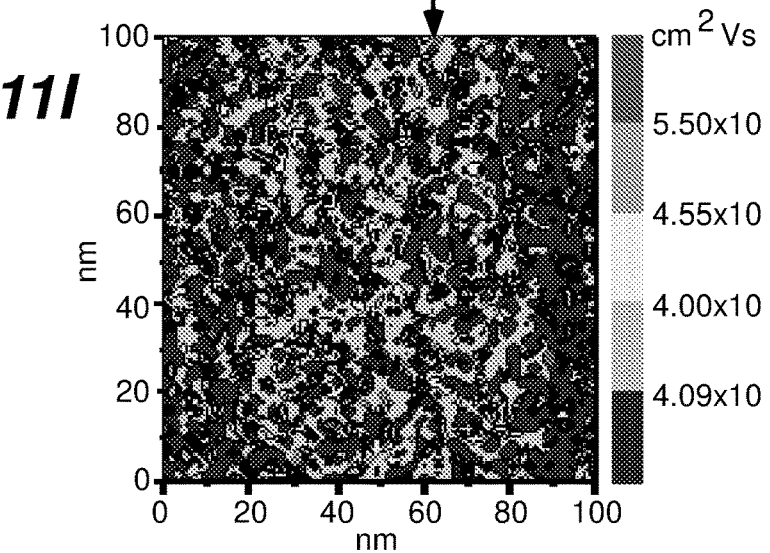
FIG. 11I depicts local charge mapping of portion AA of FIG. 11G.

FIGS. 11A-11I exemplify results achievable with system 100. FIG. 11A is a contact mode AFM image of the topography of an 800 nm×800 nm portion of a perovskite thin film having a lead iodide (PbI$_2$) concentration of 0.56 M (PbI$_2$), with a 100 nm×100 nm portion AA designated. FIG. 11B depicts local charge mapping of the area corresponding to FIG. 11A in cm$^2$/V-s, while FIG. 11C depicts local charge mapping of portion AA of FIG. 11A in cm$^2$/V-s. FIG. 11D is a contact mode AFM image of the topography of an 800 nm×800 nm portion of a perovskite thin film having a lead iodide (PbI$_2$) concentration of 1.0 M (PbI$_2$), with a 100 nm×100 nm portion AA designated. FIG. 11E depicts local charge mapping of the area corresponding to FIG. 11D in cm$^2$/V-s, while FIG. 11F depicts local charge mapping of portion AA of FIG. 11D in cm$^2$/V-s. FIG. 11G is a contact mode AFM image of the topography of an 800 nm×800 nm portion of a perovskite thin film having a lead iodide (PbI$_2$) concentration of 1.4 M (PbI$_2$), with a 100 nm×100 nm portion AA designated. FIG. 11H depicts local charge mapping of the area corresponding to FIG. 11G in $cm^2$/V-s, while FIG. 11I depicts local charge mapping of portion AA of FIG. 11G in $cm^2$/V-s.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for detecting local charge carrier dynamics, the system comprising:
   an atomic force microscope system having a conductive tip;
   an electrically isolated sample holder defining an aperture;
   an optical source configured to direct light through the aperture and towards the conductive tip;
   a function generator configured to drive the optical source and provide a coordinated voltage to a sample positioned on the substrate and adjacent to the tip; and
   a bypass circuit directly connected to the tip to collect analog data corresponding to charge recombination and transfer.

2. The system of claim 1, wherein the sample holder is electrically isolated from ground by plastic washers.

3. The system of claim 1, wherein the optical source is a laser.

4. The system of claim 3, wherein the laser is tunable to a wavelength corresponding to a bandgap of an expected sample.

5. The system of claim 1, further comprising an environmental control chamber configured to house the atomic force microscope, the substrate, and the sample.

6. The system of claim 1, further comprising:
   a frequency response analyzer configured to sweep the frequency for nanoscale impedance measurement by using atomic force microscope;
   a high bandwidth oscilloscope configured to receive the analog data corresponding to charge recombination and transfer from the bypass circuit; and
   a processor configured to detect local transient photovoltage data, local transient photocurrent data, Local Charge Extraction by Linearly Increasing Voltage (L-CELIV) data, Local Photo-CELIV (LP-CELIV) data, and local nanoscale impedance data, each based on the combination of the signal from the atomic force microscope and the bypass circuitry;
   wherein the processor is further configured to generate a local mobility map, a local carrier lifetime and transport time map, a local carrier density map, and a nanoscale impedance map based upon the obtained data.

7. The system of claim 1, wherein the bypass circuit includes a variable shunt resistor.

8. The system of claim 1, further comprising:
   a frequency response analyzer configured to sweep the frequency for nanoscale impedance measurement by using atomic force microscope;
   a high bandwidth oscilloscope configured to receive the analog data corresponding to charge recombination and transfer from the bypass circuit; and
   a processor configured to detect local transient photovoltage data, local transient photocurrent data, Local Charge Extraction by Linearly Increasing Voltage (L-CELIV) data, Local Photo-CELIV (LP-CELIV) data, and local nanoscale impedance data, each based on the combination of the signal from the atomic force microscope and the bypass circuitry.

9. The system of claim 8, wherein the processor is configured to detect local transient photovoltage data, local transient photocurrent data, Local Charge Extraction by Linearly Increasing Voltage (L-CELIV) data, Local Photo-CELIV (LP-CELIV) data, and local nanoscale impedance data, each based on the combination of the first and second signals from the frequency response analyzer and the high bandwidth oscilloscope.

10. The system of claim 8, wherein the optical source is chosen from a laser, an LED light source, or a light bulb.

11. The system of claim 8, wherein the optical source is a laser tunable to a wavelength corresponding to a bandgap of an expected sampled.

12. The system of claim 8, wherein the bypass circuit includes a variable shunt resistor.

13. A method for measuring the electrical properties of a sample, the method comprising:
   providing an atomic force microscope system having a conductive tip;
   providing an electrically isolated sample holder defining an aperture; placing the sample on the sample holder adjacent to the aperture;
   directing an optical source such that it emits a light beam towards the aperture and towards the conductive tip;
   driving the optical source by a function generator;
   providing a voltage at the sample by the function generator, wherein the voltage is coordinated with the presence of absence of the light beam at a location on the sample adjacent to the tip; and
   collecting analog data corresponding to charge recombination and transfer from the sample via a bypass circuit directly and also electrically connected to the tip.

14. The method of claim 13, wherein the substrate is electrically isolated from ground by plastic washers.

15. The method of claim 13, wherein the optical source is a laser tunable to a wavelength corresponding to a bandgap of the sample.

16. The method of claim 13, further comprising controlling an environmental control chamber that houses the atomic force microscope, the sample holder, and the sample.

17. The method of claim 13, further comprising:
   receiving a signal from a frequency response analyzer;
   receiving the analog data corresponding to charge recombination and transfer from the bypass circuit at a high bandwidth oscilloscope; and
   generating a local mobility map, a local carrier lifetime map, a local carrier density map, and a nanoscale impedance map at a processor based on the data obtained from the combination of the signal from the atomic force microscope and the bypass circuitry.

18. The method of claim 13, wherein the bypass circuit includes a variable shunt resistor.

19. The method of claim 13, further comprising:
   receiving a signal from the atomic force microscope at a frequency response analyzer;
   receiving the analog data corresponding to charge recombination and transfer from the bypass circuit at a high bandwidth oscilloscope;
   combining the signal from the frequency response analyzer and the analog data from the high bandwidth oscilloscope at a processor; and
   generating a local mobility map, a local carrier lifetime map, a local carrier density map, and a nanoscale impedance map at the processor based on the data obtained from the combination of the signal from the atomic force microscope and the bypass circuitry.

20. A system for detecting local charge carrier dynamics, the system comprising:
   an atomic force microscope system having a conductive tip;
   an electrically isolated sample holder defining an aperture;
   an optical source configured to direct light through the aperture and towards the conductive tip;
   a function generator configured to drive the optical source and provide a coordinated voltage to a sample positioned on the substrate and adjacent to the tip;
   a bypass circuit directly connected to the tip to collect analog data corresponding to charge recombination and transfer;
   a frequency response analyzer configured to sweep the frequency for nanoscale impedance measurement by using atomic force microscope;
   a high bandwidth oscilloscope configured to receive the analog data corresponding to charge recombination and transfer from the bypass circuit; and
   a processor configured to combine a first signal from the frequency response analyzer a second signal from the high bandwidth oscilloscope to generate a local mobility map, a local carrier lifetime and transport time map, a local carrier density map, and a nanoscale impedance map.

* * * * *